US011455776B2

(12) United States Patent
Fu et al.

(10) Patent No.: US 11,455,776 B2
(45) Date of Patent: Sep. 27, 2022

(54) NETWORK AND SYSTEM FOR NEURAL POSE TRANSFER

(71) Applicant: Fudan University, Shanghai (CN)

(72) Inventors: Yanwei Fu, Shanghai (CN); Xiangyang Xue, Shanghai (CN); Yinda Zhang, Shanghai (CN); Chao Wen, Shanghai (CN); Haitao Lin, Shanghai (CN); Jiashun Wang, Shanghai (CN); Tianyun Zou, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 0 days.

(21) Appl. No.: 17/016,943

(22) Filed: Sep. 10, 2020

(65) Prior Publication Data
US 2021/0407200 A1 Dec. 30, 2021

(30) Foreign Application Priority Data
Jun. 30, 2020 (CN) .......................... 202010630438.3

(51) Int. Cl.
*G06T 17/20* (2006.01)
*G06T 19/20* (2011.01)
(Continued)

(52) U.S. Cl.
CPC ......... *G06T 17/205* (2013.01); *G06N 3/0481* (2013.01); *G06N 3/08* (2013.01); *G06T 19/20* (2013.01); *G06T 2219/2004* (2013.01)

(58) Field of Classification Search
CPC .................. G06T 17/205; G06T 19/20; G06T 2219/2004; G06T 17/20; G06T 9/002;
(Continued)

(56) References Cited

U.S. PATENT DOCUMENTS

2020/0160153 A1* 5/2020 Elmoznino ............. G06T 11/60
2021/0097691 A1* 4/2021 Liu .......................... G06N 3/02

FOREIGN PATENT DOCUMENTS

WO  WO-2020234449 A1 * 11/2020 ........... G06N 3/0454
WO  WO-2021156511 A1 *  8/2021 ........... G06N 3/0445

OTHER PUBLICATIONS

Wang, Jiashun, et al. "Neural pose transfer by spatially adaptive instance normalization." Proceedings of the IEEE/CVF Conference on Computer Vision and Pattern Recognition. 2020.*
(Continued)

*Primary Examiner* — Sarah Lhymn
(74) *Attorney, Agent, or Firm* — Brad Bertoglio; Intelink Law Group, P.C.

(57) ABSTRACT

A network for neural pose transfer includes a pose feature extractor, and a style transfer decoder, wherein the pose feature extractor comprises a plurality of sequential extracting stacks, each extracting stack consists of a first convolution layer and an Instance Norm layer sequential to the first convolution layer. The style transfer decoder comprises a plurality of sequential decoding stacks, a second convolution layer sequential to the plurality of decoding stacks and a tan h layer sequential to the second convolution layer. Each decoding stack consists of a third convolution layer and a SPAdaIn residual block. A source pose mesh is input to the pose feature extractor, and an identity mesh is concatenated with the output of the pose feature extractor and meanwhile fed to each SPAdaIn residual block of the style transfer decoder. A system thereof is also provided.

20 Claims, 7 Drawing Sheets
(7 of 7 Drawing Sheet(s) Filed in Color)

(51) Int. Cl.
*G06N 3/08* (2006.01)
*G06N 3/04* (2006.01)

(58) Field of Classification Search
CPC ...... G06N 3/0481; G06N 3/08; G06N 3/0454; G06N 3/084
See application file for complete search history.

(56) References Cited

OTHER PUBLICATIONS

Park, Taesung, et al. "Semantic image synthesis with spatially-adaptive normalization." Proceedings of the IEEE/CVF Conference on Computer Vision and Pattern Recognition. 2019.*

Huang, Xun, and Serge Belongie. "Arbitrary style transfer in real-time with adaptive instance normalization." Proceedings of the IEEE International Conference on Computer Vision. 2017.*

* cited by examiner (a) concat1   (b) w/o SPAdaIN   (c) w/o edg   (d) full model (a) Pose     (b) DT(5)     (c) Ours

NETWORK AND SYSTEM FOR NEURAL POSE TRANSFER

RELATED APPLICATIONS

The present patent application claims priority of Chinese Patent Application No. 202010630438.3, filed on Jun. 30, 2020. The entire content of the foregoing application is incorporated herein by reference.

TECHNICAL FIELD

This invention is related to a network for neural pose transfer, and more particularly, for transferring the pose of source human mesh to deform the target human mesh, while the source and target meshes may have different identity information. This invention is also related to a system thereof.

BACKGROUND

Pose transfer has been studied for decades, in which the pose of a source mesh is applied to a target mesh. Traditional studies assume that the paired source and target meshes are existed with the point-wise correspondences of user annotated landmarks/mesh points, which requires heavy labelling efforts. On the other hand, the generalization ability of deep models is limited, when the source and target meshes have different identities.

For example, one can easily transfer the pose from the mesh of one person to another in the games and movies. However, it is very challenging when there is a huge "shape gap" given very different identities of source and target meshes. To make this feasible, previous works demand re-enforcing the correspondence between source and target meshes, additional information, such as point-wise correspondence (Sumner et al., "Deformation transfer for triangle meshes", *ACM*, 2004), an auxiliary mesh (Xu et al., "Gradient domain editing of deforming mesh sequences", *ACM*, 2007), human key point annotations (Ben et al., "Spatial deformation transfer", ACM, 2009), skeleton pose (Chu et al., "Example-based deformation transfer for 3d polygon models", *J. Inf. Sci. Eng.*, 2010), dense correspondence (Groueix et al., "3d-coded: 3d correspondences by deep deformation", *ECCV,* 2018), and so on.

Unfortunately, it is non-trivial, and time-consuming to obtain such additional inputs for deformation transfer.

Before starting to introduce our invention, related work in this area are introduced as follows, including, deformation transfer, deep learning for non-rigid shape representation, and conditional normalization and style transfer.

Traditional methods based on skinning skeleton animation require additional manual adjustment. Alternatively, some works leverage affine transformations to generate target shapes. Sumner et al. (see supra.) transfer deformation gradients, but requires corresponding landmarks to handle the differences between shapes. Baran et al. ("Semantic deformation transfer", ACM, 2009) assume semantic relationships between the poses of two characters. However, the requirement of semantic similarity pairs limits the usability of this approach. Ben et al. (see supra.) deform to target shapes with the help of a set of control cages. Chu et al. (see supra.) proposed to use a few examples to generate natural results. Even with impressive success, the reliance on auxiliary data makes it difficult to automatically transfer pose for graphics-based methods. To address this, Gao et al. ("Automatic unpaired shape deformation transfer", *ACM*, 2018) proposed VC-GAN, using cycle consistency to achieve the deformation transfer. But this approach also raises another problem, losing versatility due to over-reliance on training data. Whenever dealing with new identities, it needs to gather training data and retrain the model.

Tan et al. ("Variational autoencoders for deforming 3d mesh models" *CVPR,* 2018) and Litany et al ("Deformable shape completion with graph convolutional autoencoders", CVPR, 2018) proposed mesh variational autoencoder to learn mesh embedding for shape synthesis. However, they merely use the fully-connected layer which will consume a large amount of computing resources. Feng et al. ("Meshnet: Mesh neural network for 3d shape representation. *AAAI,* 2019) used mesh convolution to capture the triangle faces feature of 3D mesh. Although their methods use spatial and structural information, the features represented by faces are not suitable for neural pose transfer. Qi et al. proposed PointNet ("Pointnet: Deep learning on point sets for 3d classification and segmentation", CVPR, 2017) to extract features from unorganized points cloud, but the missing edge information will result in deformed 3D shape with outliers.

Several conditional normalization methods have been proposed. At first, they are used in style transfer and then for other vision tasks. External data is needed in these works. After normalizing the mean and bias of the activation layer, through using these external data they learn the affine transformation parameters to de-normalize the activation layer. Park et al. ("Semantic image synthesis with spatially-adaptive normalization", CVPR, 2019) proposes a similar idea to help with the image synthesis but from a spatial way using the spatially-varying semantic mask.

In sum, there is a need to provide a new and different mechanism for neural pose transfer.

SUMMARY

In this invention it is proposed an efficient deep learning based architecture to efficiently transfer the pose from source meshes to target meshes. The whole network is designed as generalizing the style transfer in the image domain to deal with points. Shared weights convolution layers are used as the network structure of encoder (i.e. pose feature extractor), SPAdaIN (a kind of conditional normalization, see infra.) is also introduced as the novel component in the network structure of decoder.

FIG. 1 illustratively shows the main difference between the traditional deformation transfer methods and the one according to this invention. As shown, traditional deformation transfer aims to produce a new 3D shape given a pair of source and target shapes as well as a deformed source shape, making the target shape do the same deformation, while in this invention, it only requires the pose and identity mesh but no more extra input.

In one aspect of this invention, it is provided a network for neural pose transfer, including a pose feature extractor, and a style transfer decoder sequential to the pose feature extractor, wherein the pose feature extractor comprises a plurality of sequential extracting stacks, each extracting stack consists of a first convolution layer and an Instance Norm layer sequential to the first convolution layer;

the style transfer decoder comprises a plurality of sequential decoding stacks, a second convolution layer sequential to the plurality of decoding stacks and a tanh layer sequential to the second convolution layer; each decoding stack consists of a third convolution layer and a SPAdaIn residual block;

each SPAdaIn residual block comprises a plurality of SPAdaIn sub-stacks, and each SPAdaIn sub-stack comprises a SPAdaIn unit and a fourth convolution layer following the SPAdaIn unit;

each SPAdaIn unit comprises an Instance Norm layer and a plurality of fifth convolution layers; and a source pose mesh is input to the pose feature extractor, and an identity mesh is concatenated with the output of the pose feature extractor and meanwhile fed to each SPAdaIn residual block of the style transfer decoder.

Preferably, the pose feature extractor comprises three extracting stacks.

Preferably, the first, second, third, fourth and/or fifth convolution layer is a 1×1 convolution layer.

Preferably, the style transfer decoder comprises three decoding stacks.

Preferably, each SPAdaIn residual block comprises three SPAdaIn sub-stacks.

Preferably, each SPAdaIn unit comprises two fifth convolution layers.

Preferably, the identity mesh is fed to each SPAdaIn unit of the SPAdaIn residual block.

Preferably, the identity mesh is fed to each fifth convolution layer of the SPAdaIn unit.

Preferably, the network is for transferring a pose of source mesh to deform a target mesh.

Preferably, the source mesh is a source human mesh, and/or the target mesh is a target human mesh.

Preferably, the SPAdaIn unit is characterized as follows, $$\mu_{n,c}^i = \frac{1}{V^i} \sum_v h_{n,c,v}^i \quad (1)$$

$$\sigma_{n,c}^i = \sqrt{\frac{1}{V^i} \sum_v (h_{n,c,v}^i - \mu_{n,c}^i)^2 + \varepsilon} \quad (2)$$

$$SPAdaIN(h, M) = \gamma_v^i(M)\left(\frac{h_{n,c,v}^i - \mu_{n,c}^i}{\sigma_{n,c}^i}\right) + \beta_v^i(M) \quad (3)$$

where for the i-th layer, M is the 3D model providing identity, $V_i$ is the number of 3D shape vertices in this layer, $C^i$ is the number of feature channel, N denotes the batch size, h is the activation value of network, while the footnote indicate specific index where n∈N; c∈$C^i$; v∈$V^i$, γ is learnable scale and β is learnable bias β, ε=1e−5 for numerical stability.

In another aspect of this invention, it is provided a network for neural pose transfer, including a pose feature extractor for receiving an input pose, and a style transfer decoder for receiving for extract pose feature, wherein the pose feature extractor comprises a first number of convolution layers and a first number of Instance Norm layers; the first number of convolution layers and the first number of Instance Norm layers are iteratively and serially connected;

the style transfer decoder comprises a second number of convolution layers, a third number of SPAdaIn residual blocks, and a tanh layer; the second number is one more than the third number; the second number of convolution layers and the third number of SPAdaIn residual blocks are iteratively and serially connected, with the convolution layers sandwiching the SPAdaIn residual blocks; and the tanh layer is the last layer of the style transfer decoder;

an input identity mesh is concatenated with the output of the pose feature extractor and then input to the style transfer decoder, and the input identity mesh is meanwhile fed to each SPAdaIn residual block of the style transfer decoder.

Preferably, the first number equals to three, and/or the third number equals to three.

Preferably, each SPAdaIn residual block comprises a fourth number of SPAdaIn unit and a fourth number of convolutional layer iteratively and serially connected to each other and forming a first branch, and a fifth number of SPAdaIn unit and a fifth number of convolutional layer iteratively and serially connected to each other and forming a second branch; the second branch is parallel to the first branch.

Preferably, the fourth number equals to two, and/or the fifth number equals to one.

Preferably, the output of the second branch is added to the output of the first branch.

Preferably, each SPAdaIn unit comprises a sixth number of Instance Norm layer and a seventh number of convolution layers.

Preferably, the sixth number equals to one, and/or the seventh number equals to two.

Preferably, the output of the Instance Norm layer is multiplied with the output of the first one of the two convolution layers, and then the result is added to the output of the second one of the two convolution layers.

In yet another aspect of this invention, it is provided a system for neural pose transfer, including an input device, a processor for processing the input data, and an output device for outputting the processed data; wherein the processor is configured to build a computing model as the network as the aspect stated above.

In general, this invention has the ability in generalizing to transfer poses to unseen meshes and being invariant to different vertex orders of source and target meshes. It also works well in transferring poses in noisy conditions and in handing arbitrary vertex permutation, most importantly without relying on the additional input from auxiliary meshes or extra knowledge as previous works.

BRIEF DESCRIPTION OF DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

The patent or application file contains at least one drawing executed in color. Copies of this patent or patent application publication with color drawing(s) will be provided by the Office upon request and payment of the necessary fee.

Figure 1:
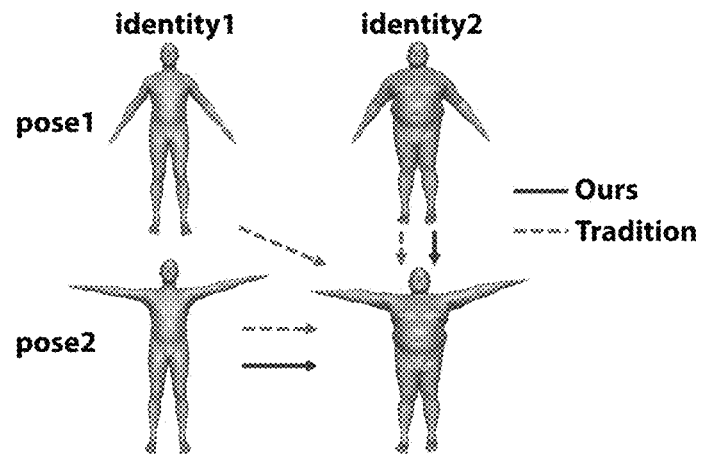
Figure 2:
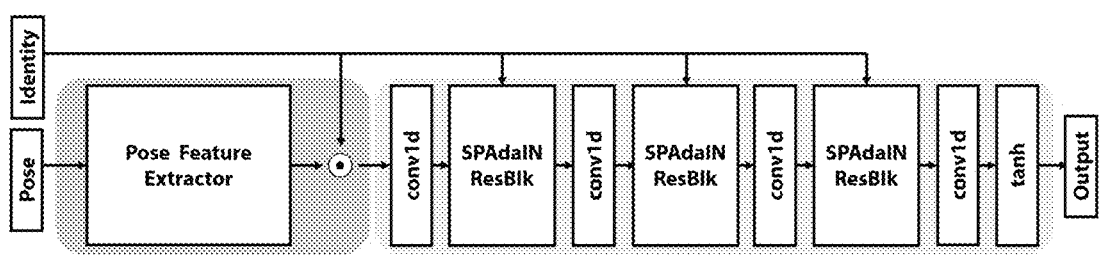
Figure 3:
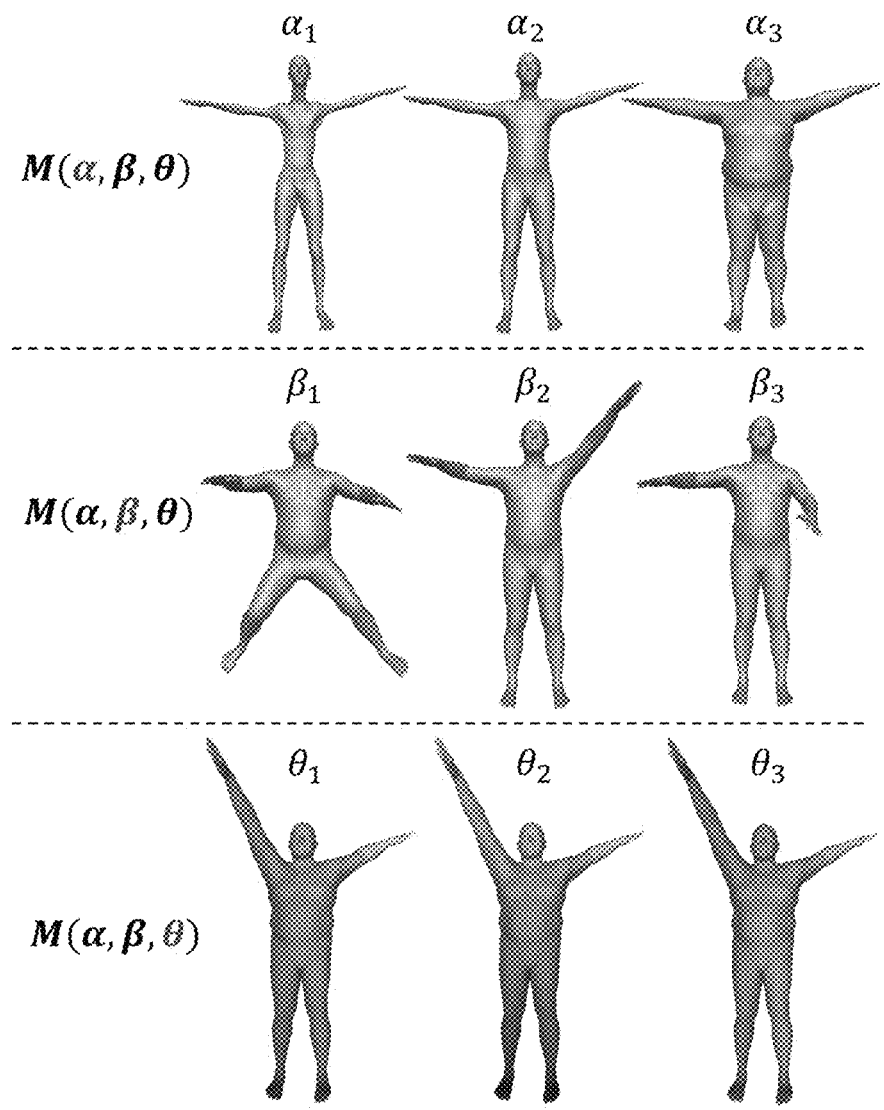
Figure 4:
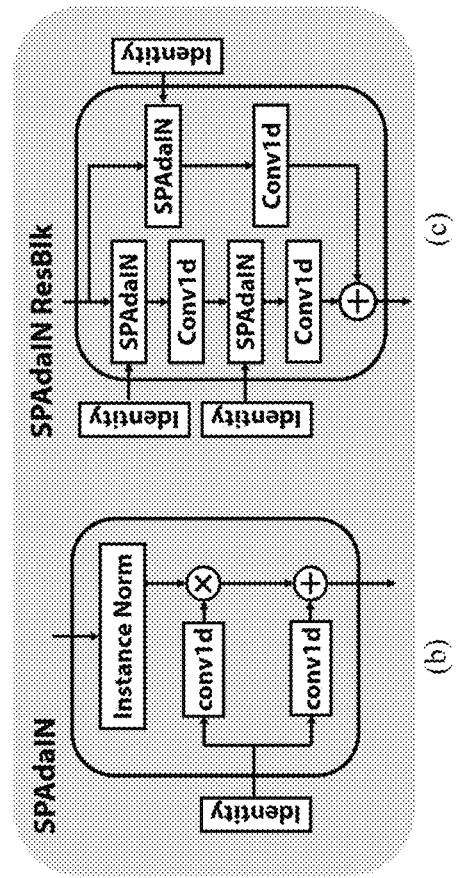
Figure 4:
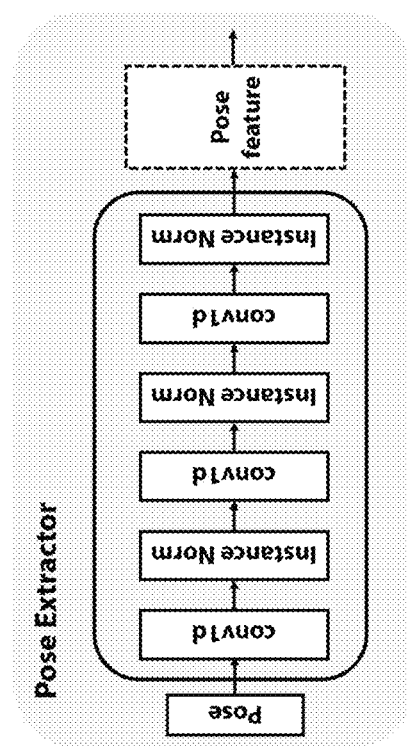
Figure 5:
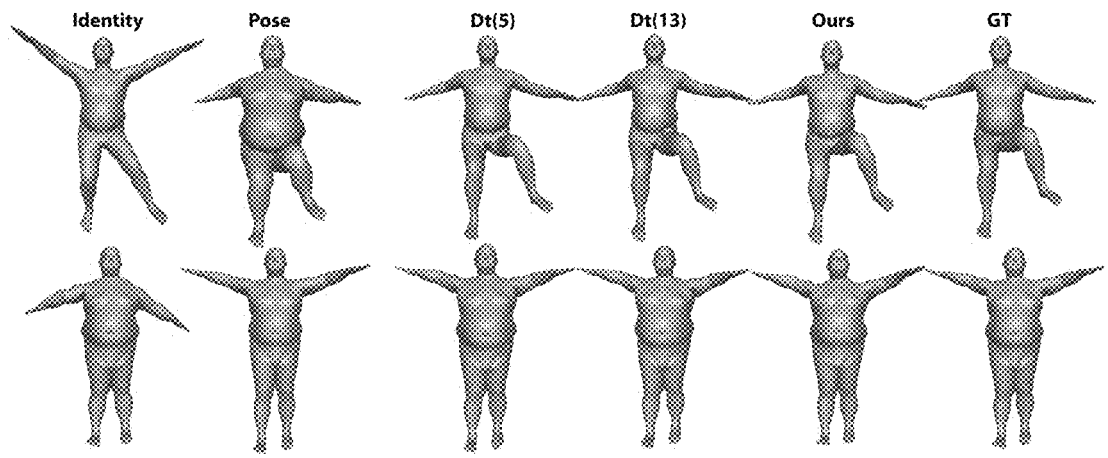
Figure 6:
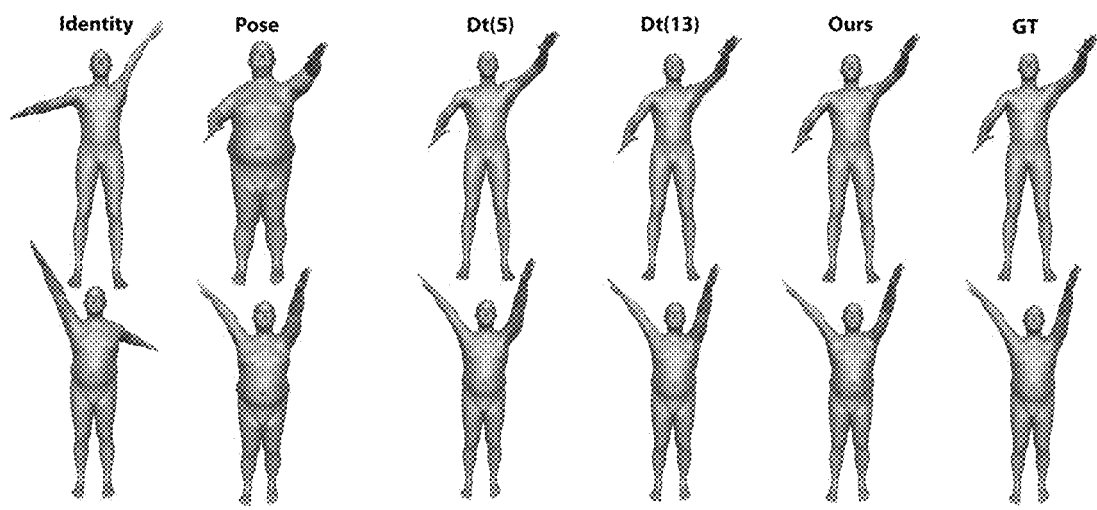
Figure 7:
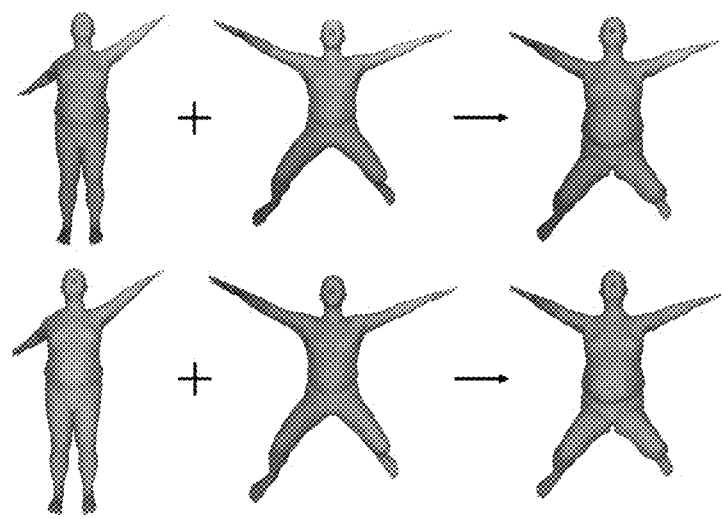
Figure 8:
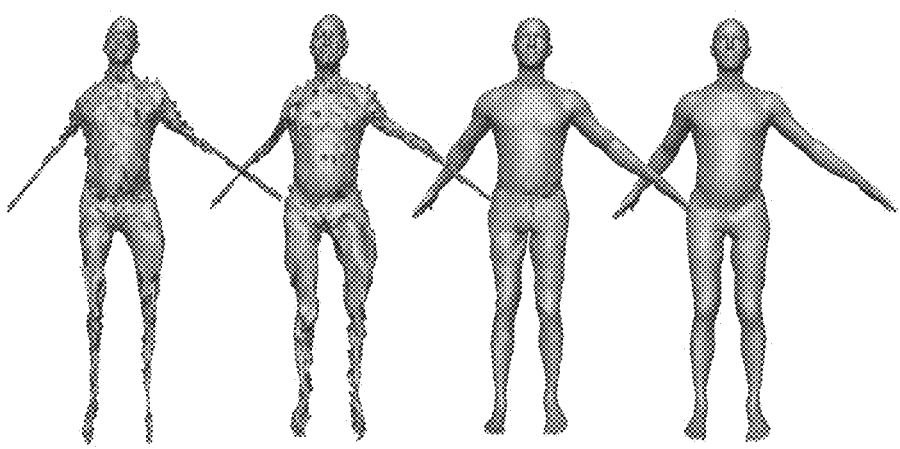
Figure 9:
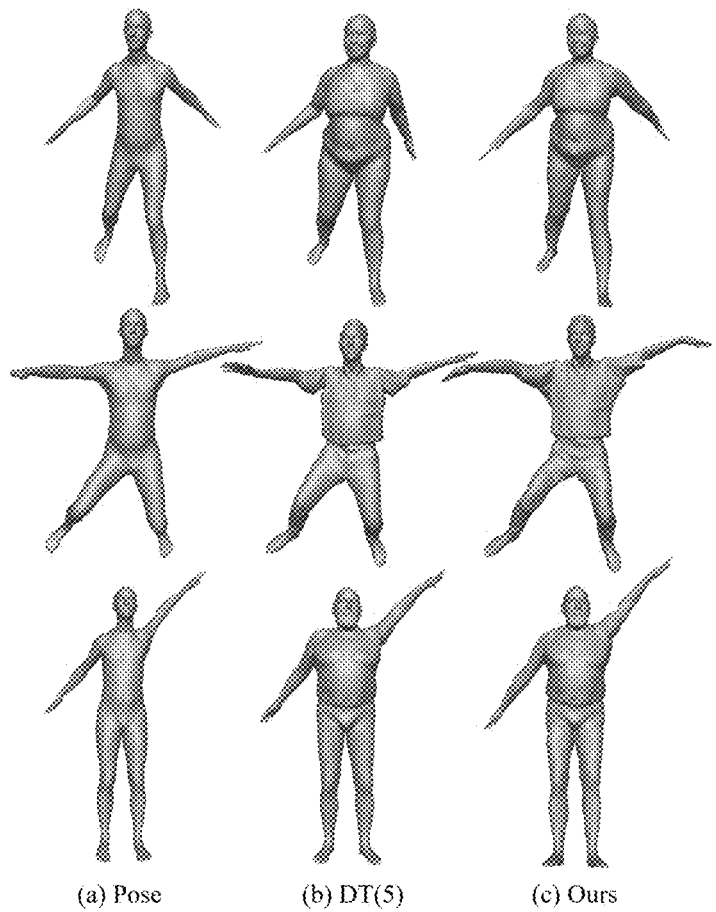
Figure 10:
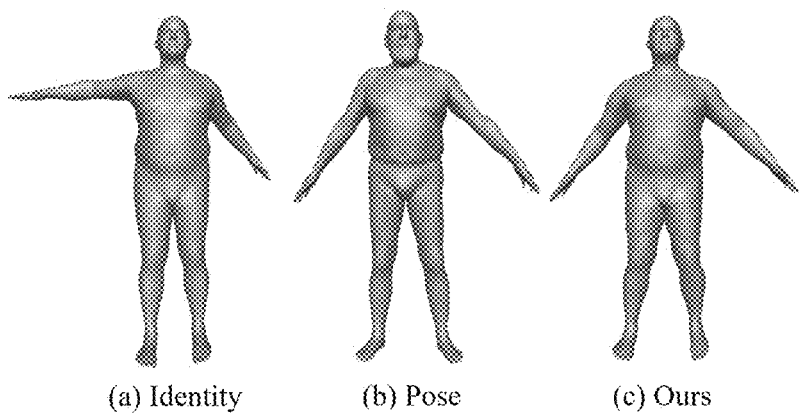

Wherein:

FIG. 1 illustratively shows the main difference between the traditional deformation transfer methods and the one according to this invention;

FIG. 2 illustratively shows the network architecture of the deep learning model for human pose transfer according to one embodiment of this invention;

FIG. 3 illustratively shows the influence of different parameters on 3D human mesh model;

FIG. 4 illustratively shows the detailed architecture of the network component, wherein FIG. 4(a) shows the architecture of Pose Extractor E, FIG. 4(b) shows the architecture of SPAdaIN and FIG. 4(c) shows the architecture of SPAdaIN ResBlock;

FIG. 5 illustratively shows the qualitative comparison of seen pose;

FIG. 6 illustratively shows the qualitative comparison of unseen pose;

FIG. 7 illustratively shows the input and output meshes with color encoding the vertex index;

FIG. 8 illustratively shows the qualitative ablation study results;

FIG. 9 illustratively shows the qualitative Non-SMPL based identity;

FIG. 10 illustratively shows the qualitative Non-SMPL based pose; and

Figure 11:
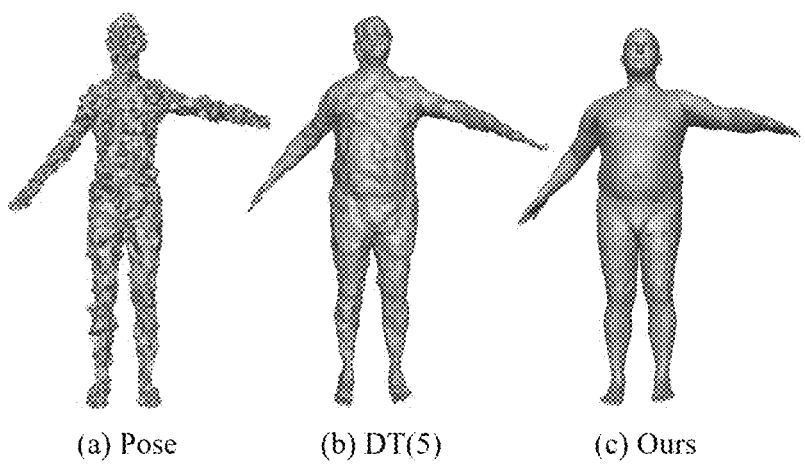

FIG. 11 illustratively shows the robustness to noise.

DETAILED DESCRIPTION

Before explaining at least one embodiment of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation-specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

Embodiments of the subject matter and the functional operations described in this specification optionally can be implemented in digital electronic circuitry, or in computer software, firmware, or hardware, including the structures disclosed in this specification and their structural equivalents, or in combinations of one or more of them. Embodiments of the subject matter described in this specification can, for example, be implemented as one or more computer program products, e.g., one or more modules of computer program instructions encoded on a computer readable medium for execution by, or to control the operation of, data processing apparatus.

The computer readable medium can be a machine readable tangible storage device, a machine readable tangible storage substrate, a tangible memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A computer program (also known as a program, software, software application, script, or code), can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

FIG. 2 illustratively shows the network architecture of the deep learning model for human pose transfer according to one embodiment of this invention. The blue part is a permutation invariant encoder (pose feature extractor), and the yellow part is SPAdaIN guided decoder. Given $M_{id}$ and $M_{pose}$ as input, the model produces mesh transferred to new posture. The symbol ⊙ denotes the operation of concatenation.

Taking the source mesh carrying the pose, the model produces a feature for each vertex encoding both local details and global context. These per-vertex features are then concatenated with the vertex locations in the target mesh providing identity, which is fed into the style transfer decoder consists of SPAdaIN ResBlocks. Throughout the decoder, each feature produces one vertex in the output mesh under the guide of a vertex from the target mesh. The final output mesh inherits the pose from the source mesh and the identity from the target. The mesh vertex order is consistent with the identity mesh.

FIG. 3 illustratively shows the influence of different parameters on 3D human mesh model. 3D human mesh is represented by $M(\alpha; \beta; \theta)$, wherein a denotes the parameters of mesh identity, which controls the mesh shape, $\beta$ represents different human posture, $\theta$ indicates the vertices order. Each row represents the change of the mesh when changing one parameter from $\alpha$; $\beta$; $\theta$. $\alpha$ controls the mesh identity, $\beta$ controls the mesh pose and $\theta$ indicates the vertices order. The mesh color of last row encodes the mesh vertex index.

Given two meshes $M_{id}=M(\alpha 1; \beta 1; \theta 1)$ and $M_{pose}=M(\alpha 2; \beta 2; \theta 2)$, the goal of the model is to transfer the pose to the identity mesh by producing output mesh $M_{output}=\hat{M}(\alpha 1; \beta 2; \theta 1)$.

FIG. 4 illustratively shows the detailed architecture of the network component, wherein FIG. 4(a) shows the architecture of Pose Extractor E, FIG. 4(b) shows the architecture of SPAdaIN and FIG. 4(c) shows the architecture of SPAdaIN ResBlock.

See FIG. 4(a) for the detail of pose feature extractor E. The encoder aims to extract the feature $F_{pose}$ for the orderless input mesh vertices. The encoder E takes $M_{pose}$ vertices coordinates through pose feature extractor as illustrated in FIG. 4(a). The pose feature extractor consists of 3 stacked 1×1 convolution and InstanceNorm layers, all activation functions applied for convolution layers are ReLU. Then the encoder concatenates pose features with the vertices coordinates of template identity mesh $M_{id}$ to produce latent embedding $Z=F_{pose} \odot M_{id}$ eventually (⊙ denotes concatenation). It is to note that $F_{pose}$ are tensors rather than global vectors. Since the vertex orders of different training data are not consistent, and normalization is essential to aggregate the global context, InstanceNorm (IN) is the only choice to normalize the features. However, if E encodes pose feature as a global vector and then attaching it to $M_{id}$, calculating IN will lead the pose features to be normalized to zero. So it is preferred to learn the pose feature with the same spatial size as $M_{id}$. This will allow the whole pipeline to preserve spatial information and be free from the requirement of point-wise correspondence between $M_{id}$ and $M_{pose}$.

See FIG. 4(b) for the detail of SPAdaIN. In this invention, spatially conditional normalization is proposed to generate the 3D human shape applied to pose transfer tasks while keeping the identity of meshes. In particular, SPAdaIN is a generalization of the work of Huang et al. ("Arbitrary style transfer in real-time with adaptive instance normalization", ICCV, 2017) and Park et al. ("Semantic image synthesis with spatially-adaptive normalization", CVPR, 2019) to deal with points. Similar to IN, the activation is normalized across the spatial dimensions independently for each channel and instance, and then modulated with learned scale $\gamma$ and bias $\beta$. It is assumed that in the i-th layer, M is the 3D model providing identity, $V^i$ is the number of 3D shape vertices in this layer, $C^i$ is the number of feature channel, N denotes the batch size, and h is the activation value of network (the footnote indicate specific index where $n \in N$; $c \in C^i$; $v \in V^i$). The value normalized by SPAdaIN can be computed as follows, $$\mu_{n,c}^i = \frac{1}{V^i} \sum_v h_{n,c,v}^i \qquad (1)$$

$$\sigma_{n,c}^i = \sqrt{\frac{1}{V^i} \sum_v (h_{n,c,v}^i - \mu_{n,c}^i)^2 + \varepsilon} \qquad (2)$$

$$SPAdaIN(h, M) = \gamma_v^i(M) \left( \frac{h_{n,c,v}^i - \mu_{n,c}^i}{\sigma_{n,c}^i} \right) + \beta_v^i(M) \qquad (3)$$

where $\gamma$ and $\beta$ are learnable affine parameters, $\varepsilon=1e-5$ for numerical stability. As shown in FIG. 4(b), in SPAdaIN the external data $M_{id}$ is fed into 2 different 1×1 convolution layers to produce the modulation parameters γ and β. The parameters are multiplied and added to the normalized feature.

SPAdaIN is different from some other conditional normalization.

Compare to SPADE (Park et al., "Semantic image synthesis with spatially-adaptive normalization", CVPR, 2019), instance normalization is used here. Since each instance may have different features to guide the transfer, normalize the activation of the network in channel-wise is not reasonable. So, we normalize the spatially-variant parameters instance-wise, which is more suitable for the neural pose transfer task. Compare to CIN (Dumoulin et al. "A learned representation for artistic style", 2016), in this invention normalization parameter vectors are not selected from a fixed set of identities or pose, the corresponding parameters γ and β are adaptively learned, therefore, their approach cannot adapt to new identities or pose without re-training. Also, their parameters are aggregated across spatial axes; thus they may lose some detailed feature in particular spatial positions. Additionally, AdaIN (Huang et al., "Arbitrary style transfer in real-time with adaptive instance normalization", ICCV, 2017) is also not suitable for pose transfer. Though AdaIN can handle arbitrary new identities or pose as guidance, there are no learnable parameters in AdaIN. Due to the lack of learnable parameters, when adopting AdaIN as normalization, the network will tend to imitate the shape of M rather than use it as a condition to produce new posture.

See FIG. 4(c) for the detail of SPAdaIN ResBlock (residual block). It is first to feed the latent embedding Z into the decoder, consisting of multiple SPAdaIN ResBlocks. As shown in FIG. 2, the overall architecture has 3 SPAdaIN ResBlocks. Each SPAdaIN ResBlock consists of SPAdaIN units followed by a 1×1 convolution layer and ReLU activation function, and 3 identical units are organized in the form of residual block (see e.g. He et al. "Deep residual learning for image recognition", CVPR, 2016. The output of this operation is then fed to a tanh layer, generating the final output $M_{output}$. The details of the network architecture according to one preferable embodiment is shown in Tab. 1, where N is the batch size and V is the number of vertices. Our network consists of two main parts: the pose feature extractor (1-9) and the style transfer decoder for pose transfer (10-17). Both components are composed of 1×1 convolution and instance normalization.

TABLE 1

The network architecture of the wholemodel

| Index | Inputs | Operation | Output Shape |
|---|---|---|---|
| (1) | Input | Identity Mesh | N × 3 × V |
| (2) | Input | Pose Mesh | N × 3 × V |
| (3) | (1) | conv1d (3 → 64, 1 × 1) | N × 64 × V |
| (4) | (3) | Instance Norm, Relu | N × 64 × V |
| (5) | (4) | conv1d (64 → 128, 1 × 1) | N × 128 × V |
| (6) | (5) | Instance Norm, Relu | N × 128 × V |
| (7) | (6) | conv1d (128 → 1024, 1 × 1) | N × 1024 × V |
| (8) | (7) | Instance Norm, Relu | N × 1024 × V |
| (9) | (2), (8) | Concatenate | N × 1027 × V |
| (10) | (9) | conv1d (1027 → 1027, 1 × 1) | N × 1027 × V |
| (11) | (10) | SPAdaIN ResBlk 1 (C = 1027) | N × 1027 × V |
| (12) | (11) | conv1d (1027 → 513, 1 × 1) | N × 513 × V |
| (13) | (12) | SPAdaIn ResBik 2 (C = 513) | N × 513 × V |
| (14) | (13) | conv1d (513 → 256, 1 × 1) | N × 256 × V |
| (15) | (14) | SPAdaIN ResBlk 3 (C = 256) | N × 256 × V |
| (16) | (15) | conv1d (256 → 3, 1 × 1) | N × 3 × V |
| (17) | (16) | tanh | N × 3 × V |

The detailed architecture of SPAdaIN Resnet Block and SPAdaIN unit are then given in Tab. 2 and Tab. 3. Different from most of other work that uses batch normalization, in this application it is to use instance normalization. Specifically, it is to consider the input 3D mesh $M \in R^{N \times 3 \times V}$ as a tensor and apply normalization individually for each training instance along the spatial dimension V. Furthermore, it is to learn the parameters $\gamma \in R^{N \times C \times V}$ and $\beta \in R^{N \times C \times V}$ of InstanceNorm which keep the spatial information.

TABLE 2

The network architecture of SPAdaTN Res-Block

| Index | Inputs | Operation | Output shape |
|---|---|---|---|
| (1) | Input | Identity Mesh | N × 3 × V |
| (2) | Input | Input Features | N × C × V |
| (3) | (1), (2) | SPAdaIN 1 (C = C) | N × C × V |
| (4) | (3) | conv1d (C → C, 1 × 1), Relu | N × C × V |
| (5) | (1), (4) | SPAdaIN 2 (C = C) | N × C × V |
| (6) | (5) | conv1d (C → C, 1 × 1), Relu | N × C × V |
| (7) | (1), (2) | SPAdaIN3 (C = C) | N × C × V |
| (8) | (7) | conv1d (C → C, 1 × 1), Relu | N × C × V |
| (9) | (5), (8) | Add | N × C × V |

TABLE 3

The network architecture of SPAdaIN unit

| Index | Inputs | Operation | Output shape |
|---|---|---|---|
| (1) | Input | Identity Mesh | N × 3 × V |
| (2) | Input | Input Features | N × C × V |
| (3) | (1) | conv1d (3 → C, 1 × 1) | N × C × V |
| (4) | (1) | conv1d (3 → C, 1 × 1) | N × C × V |
| (5) | (2) | Instance Norm | N × C × V |
| (6) | (3), (5) | Multiply | N × C × V |
| (7) | (4), (6) | Add | N × C × V |

To efficiently train the network of this invention, it is to introduce and define the loss function L as follows $$\mathcal{L} = \mathcal{L}_{rec} + \lambda_{edg} \cdot \mathcal{L} \quad (4)$$

where λedg is coefficients of edge regularization.

The loss aims to regress the vertices close to its correct position. It is to pre-process the ground truth with the same vertices number as template identity model and train the network using the supervision of pointwise L2 distance between the mesh predicted by our model $\hat{M}(\alpha 1; \beta 2; \theta 1)$ and the ground truth mesh $M(\alpha 1; \beta 2; \theta 1)$.

$$\mathcal{L}_{rec} = \|\hat{M}(\alpha_1, \beta_2, \theta_1) - M(\alpha_1, \beta_2, \theta_1)\|_2^2 \quad (5)$$

Directly regress vertices position will not guarantee that the transferred of avoiding producing the over-length edges, since it is tended to make the generated model has a smooth surface. To address this problem, it is further proposed an edge length regularization penalizing the long edges. Specifically, this regularization enforces the output mesh surface to be tight, resulting in a smooth surface. Preferably, let N(p) be the neighbor of vertex p, the edge length regularization can be defined as follows, $$\mathcal{L}_{edg} = \sum_{p} \sum_{v \in N(p)} \|p - v\|_2^2 \quad (6)$$

Experiments

We use SMPL model (see Loper et al. "Smpl: A skinned multiperson linear model", *ACM*, 2015) to generate training and test data by randomly sampling the parameter space. To create training data, we generate meshes of 16 identities with 400 poses, and randomly pick two as a pair for training. The ground truth is obtained by running SMPL model with the desired shape and pose parameters from two meshes respectively. In order to be invariance to the vertex order, the mesh vertices are shuffled randomly before feeding into the network. Accordingly, the ground truth mesh is shuffled in the same manner as the identity mesh such that they are point-wise aligned to its corresponding input mesh.

In the test step, we evaluate our model for transferring the seen and unseen poses to new identities. To do so, we create 14 new identities that are not in the training set. We use these new identities to form 72 pairs with randomly selected training pose, and 72 pairs with newly created poses. To further test how our model generalizes, we employ the meshes from FAUST (Bogo et al., "Faust: Dataset and evaluation for 3d mesh registration", *CVPR*, 2014) and MG-dataset (Bhatnagar et al., "Multi-garment net: Learning to dress 3d people from images", *ICCV*, 2019). These meshes are not strictly consistent with SMPL but more realistic.

For all input meshes, we shift them to the center and scale them to the unit sphere, our method is robust against the global scale.

The hyper-parameters to train our network are as follows. We use Adam optimizer with the learning rate as 5e-5. The $\lambda_{edg}$ in the loss function is set as 5e-4. The model is trained for 200 epochs with batch size equaling to 8 on a single GTX 1080Ti GPU.

We prepare our training and testing data using SMPL (Loper et al., "Smpl: A skinned multiperson linear model", *ACM*, 2015) model. SMPL model has 10 morphology parameters controlling the shape and 24 sets of joint parameters controlling the pose. For shape parameters, we randomly sample from the parameter space. For pose parameters, each set of parameters has three sub-parameters represented as a tuple (x; y; z), indicating rotated joint angle around x-axis, y-axis and z-axis respectively. In order to generate natural looking poses, we constrain the rotation angle of the joints according to what human joints can physically reach. Then we sample from the constrained angle space. The details of the range can be seen in Tab. 4.

TABLE 4

| Pose parameters preparation | | | |
|---|---|---|---|
| Parameter | Rotation Degree of Axes | | |
| Index | x-axis | y-axis | z-axis |
| 1 | (−2, 2) | (−2, 2) | (−2, 2) |
| 2 | (−90, 0) | 0 | (0, 40) |
| 3 | (−90, 0) | 0 | (−40, 0) |
| 4 | (−1, 1) | (−1, 1) | (−1, 1) |
| 5 | (0, 100) | 0 | 0 |
| 6 | (0, 100) | 0 | 0 |
| 7 | (−1, 1) | (−1, 1) | (−1, 1) |
| 8 | (−10, 10) | (−10, 10) | (−1, 1) |
| 9 | (−10, 10) | (−10, 10) | (−1, 1) |
| 10 | (−1, 1) | (−1, 1) | (−1, 1) |
| 11 | (−1, 1) | (−1, 1) | (−1, 1) |
| 12 | (−1, 1) | (−1, 1) | (−1, 1) |
| 13 | (−3, 3) | (−3, 3) | (−3, 3) |
| 14 | 0 | (−30, 30) | (−30, 30) |
| 15 | 0 | (−30, 30) | (−30, 30) |
| 16 | (−3, 3) | (−3, 3) | (−3, 3) |
| 17 | 0 | (−30, 30) | (−30, 30) |
| 18 | 0 | (−30, 30) | (−30, 30) |
| 19 | 0 | (−60, 0) | 0 |
| 20 | 0 | (0, 60) | 0 |
| 21 | (−10, 10) | (−10, 10) | (−10, 10) |
| 22 | (−10, 10) | (−10, 10) | (−10, 10) |
| 23 | (−5, 5) | (0, 10) | (−10, 0) |
| 24 | (−5, 5) | (−10, 0) | (0, 10) |

Since the output mesh is point-wise aligned with the ground truth, we use Point-wise Mesh Euclidean Distance (PMD) as our evaluation metrics. Specifically, $$PMD = \frac{1}{|V|} \sum_v \|P_v - Q_v\|_2^2 \qquad (7)$$

where we have mesh vertices $Pv \in \hat{M}(\alpha 1; \beta 2; \theta 1)$ and $Qv \in M(\alpha 1; \beta 2; \theta 1)$.

Now we compare to deformation transfer baselines and show both qualitative and quantitative results. One of the most effective methods is deformation transfer (DT) (Sumner et al., see supra.), which however, has to rely on the additional control points and a third mesh, as the auxiliary input. To this end, we provide DT the third mesh and run it with 5 and 13 control points.

FIG. 5 illustratively shows the qualitative comparison of seen pose. From left to right, it is shown in each row: input identity mesh, input pose mesh, the results of DT using 5 control points and 13 control points respectively, ours results and the ground truth. Our predictions have more natural joints movement.

FIG. 6 illustratively shows the qualitative comparison of unseen pose. Both $M_{id}$ and $M_{pose}$ are unseen. From left to right, it is shown in each row: input identity mesh, input pose mesh, the results of DT using 5 control points and 13 control points respectively, ours results and the ground truth. Our predictions are more natural at joints.

As can be seen in FIG. 5, our model learns on seen poses to transfer poses effectively to new identities in the testing set, while the PMD of our method is significantly lower than that of DT which even has the additional inputs. This greatly validates the effectiveness of our model in learning to deform meshes. Furthermore, for those poses that have never been seen during the training stage, our model demonstrates very good generalization ability and still produces reasonable good results as shown in FIG. 6. Please note that DT is not a learning-based approach such that it has quite similar performance over the training and testing set.

Quantitative results are shown in Tab. 5. It shows the quantitative comparison of average PMD.

TABLE 5

| Quantitative comparison of average PMD | | | |
|---|---|---|---|
| | PMD ↓ ($\times 10^{-4}$) | | |
| Pose Type | DT(5) | DT(13) | Ours |
| seen-pose | 7.3 | 7.7 | 1.1 |
| unseen-pose | 7.2 | 6.7 | 9.3 |

To demonstrate that our model is invariant to vertex permutation of meshes, we further run our model on the same pair of meshes with the identity mesh shuffled in different orders. FIG. 7 illustratively shows the input and output meshes with color encoding the vertex index. It is shown two pairs of input meshes with different vertices orders and the predict results: from left to right, $M_{id}$, $M_{pose}$ and $M_{output}$. The order of our pose transfer results are consistent with the identity mesh. As can be seen, our model can produce similar output meshes with the input identity meshes in different shuffles. This shows that the output vertex order is maintained the same as the identity meshes.

The effectiveness of the key components of our model is verified by some ablation study. We start from a naive network architecture, where the decoder only consists of several 1-dimensional convolutional filters (conv1d). We then sequentially add ResBlock and SPAdaIN to the network. These two naive methods are named as concat1 and w/o SPAdaIN.

The quantitative evaluations are shown in Tab.6, and some examples can be found in FIG. 8.

TABLE 6

Quantitative ablation study for seen and unseen pose

| Pose Source | PMD ↓ ($\times 10^{-4}$) | | | |
|---|---|---|---|---|
| | concat1 | w/o SPAdaIN | w/o edg | full |
| seen-pose | 12.1 | 8.3 | 1.2 | 1.1 |
| unseen-pose | 46.9 | 13.7 | 10.1 | 9.3 |

Tab. 6 shows the quantitative ablation study for seen and unseen pose. The metrics of PMD is shown with a naive basline (concat1), SPAdaIN and edge regularization disabled respectively, full denotes our full model.

FIG. 8 illustratively shows the qualitative ablation study results. It is shown the generation results of (a) our naive baseline concat1, (b) our model without SPAdaIN modules, (c) our model without edge regularization and (d) our full model.

As can be seen, naive conv1d (concat1) does not perform well, and the surface details are added back gradually when adding more components to the network. Particularly, SPAdaIN is very helpful in learning the pose transfer, which reduces the error from 8.3 to 1.1 on seen poses and from 13.7 to 9.3 on unseen poses. This means the style transfer network can effectively transfer the identity as a style onto the target mesh.

We also evaluate the impact of edge regularization loss on the model performance. As compared in Tab.2, edge regularization loss consistency reduces the PMD on the testing dataset of both seen and unseen poses. From FIG. 8, the results are smoother if trained with the edge loss, compared to those without using edge regularization loss.

Furthermore, it is to investigate the generalization capability of our method from the cross source data and robustness. Specifically, we test our model with non-SMPL based identity and pose meshes. It is worth noting that the training data created by SMPL are highly constrained and lack of geometry details. Our deep learning model can handle the details beyond SMPL capacity decently.

We first test how our model performs with a human mesh that is not strictly an SMPL model. To do so, we take meshes from FAUST (see supra.) and MG-dataset (see supra.) which include dressed human meshes as the identity meshes. The model we get through SMPL training dataset does not require the order of the mesh vertex points or the number of the points as input, but it has to set the same number of points of pose mesh, as that of the identity mesh points. SMPL meshes have 6890 points each and FAUST has the same number of points as SMPL. For MG-dataset which has meshes with 27554 each, we adopt the interpolation to automatically increase the number of points of pose mesh and this is a very simple process.

FIG. 9 illustratively shows the qualitative Non-SMPL based identity. In the comparison, FAUST and MG-dataset are used as identity mesh respectively. As shown in FIG. 9, even with the identity mesh that is not from SMPL, our model still produces the correct pose while maintains the geometry details that are not encoded by SMPL, e.g., beard and the cloth. On the other hand, DT sometimes produces more obvious artifacts near fingers.

We then test our system with a non-SMPL based source mesh which provides the pose. We give examples using a mesh from FAUST as pose mesh. FIG. 10 illustratively shows the qualitative Non-SMPL based pose. It is shown results using the mesh from FAUST as pose mesh. Our system has the ability to transfer pose from Non-SMPL based mesh. As shown, our model still managed to produce reasonably good results.

Lastly, we test the model robustness against noise in the pose mesh. We manually add noise to the pose mesh by adding random perturbations to point coordinates, since there may be some noise during application sometimes. FIG. 11 illustratively shows the Robustness to noise. When using pose mesh (a) with noise, our method (c) still performs very well, however, DT (b) may maintain undesirable geometry noise It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

The invention claimed is:

1. A network for neural pose transfer, comprising a pose feature extractor, and a style transfer decoder sequential to the pose feature extractor, wherein:
    the pose feature extractor comprises a plurality of sequential extracting stacks, and each extracting stack consists of a first convolution layer and an Instance Norm layer sequential to the first convolution layer;
    the style transfer decoder comprises a plurality of sequential decoding stacks, a second convolution layer sequential to the plurality of decoding stacks and a tan h layer sequential to the second convolution layer; each decoding stack consisting of a third convolution layer and a SPAdaIN residual block;
    each SPAdaIn residual block comprises a plurality of SPAdaIn sub-stacks, and each SPAdaIn sub-stack comprises a SPAdaIn unit and a fourth convolution layer following the SPAdaIn unit;
    each SPAdaIn unit comprises an Instance Norm layer and a plurality of fifth convolution layers; and
    a source pose mesh is input to the pose feature extractor, and an identity mesh is concatenated with the output of the pose feature extractor and meanwhile fed to each SPAdaIn residual block of the style transfer decoder.

2. The network of claim 1, wherein the pose feature extractor comprises three extracting stacks.

3. The network of claim 1, wherein the first, second, third, fourth and/or fifth convolution layer is a 1×1 convolution layer.

4. The network of claim 1, wherein the style transfer decoder comprises three decoding stacks.

5. The network of claim 1, wherein each SPAdaIn residual block comprises three SPAdaIn sub-stacks.

6. The network of claim 1, wherein each SPAdaIn unit comprises two fifth convolution layers.

7. The network of claim 1, wherein the identity mesh is fed to each SPAdaIn unit of the SPAdaIn residual block.

8. The network of claim 1, wherein the identity mesh is fed to each fifth convolution layer of the SPAdaIn unit.

9. The network of claim 1, wherein the network is for transferring a pose of source mesh to deform a target mesh.

10. The network of claim 9, wherein the source mesh is a source human mesh, and/or the target mesh is a target human mesh.

11. The network of claim 1, wherein the SPAdaIn unit is characterized as follows, $$\mu_{n,c}^i = \frac{1}{V^i} \sum_v h_{n,c,v}^i \quad (1)$$

$$\sigma_{n,c}^i = \sqrt{\frac{1}{V^i} \sum_v (h_{n,c,v}^i - \mu_{n,c}^i)^2 + \varepsilon} \quad (2)$$

$$SPAdaIN(h, M) = \gamma_v^i(M)\left(\frac{h_{n,c,v}^i - \mu_{n,c}^i}{\sigma_{n,c}^i}\right) + \beta_v^i(M) \quad (3)$$

where for the i-th layer, M is the 3D model providing identity, $V^i$ is the number of 3D shape vertices in this layer, $C^i$ is the number of feature channel, N denotes the batch size, h is the activation value of network, while the footnote indicate specific index where $n \in N$; $c \in C^i$; $v \in V^i$, $\gamma$ is learnable scale and $\beta$ is learnable bias $\beta$, $\varepsilon = 1e-5$ for numerical stability.

12. A network for neural pose transfer, comprising a pose feature extractor for receiving an input pose, and a style transfer decoder for receiving for extract pose feature, wherein:
the pose feature extractor comprises a first number of convolution layers and a first number of Instance Norm layers; the first number of convolution layers and the first number of Instance Norm layers are iteratively and serially connected;
the style transfer decoder comprises a second number of convolution layers, a third number of SPAdaIn residual blocks, and a tanh layer; the second number is one more than the third number; the second number of convolution layers and the third number of SPAdaIn residual blocks are iteratively and serially connected, with the convolution layers sandwiching the SPAdaIn residual blocks; and the tan h layer is the last layer of the style transfer decoder; and
an input identity mesh is concatenated with the output of the pose feature extractor and then input to the style transfer decoder, and the input identity mesh is meanwhile fed to each SPAdaIn residual block of the style transfer decoder.

13. The network of claim 12, wherein the first number equals to three, and/or the third number equals to three.

14. The network of claim 12, wherein each SPAdaIn residual block comprises a fourth number of SPAdaIn unit and a fourth number of convolutional layer iteratively and serially connected to each other and forming a first branch, and a fifth number of SPAdaIn unit and a fifth number of convolutional layer iteratively and serially connected to each other and forming a second branch; and the second branch is parallel to the first branch.

15. The network of claim 14, wherein the fourth number equals to two, and/or the fifth number equals to one.

16. The network of claim 14, wherein the output of the second branch is added to the output of the first branch.

17. The network of claim 14, wherein each SPAdaIn unit comprises a sixth number of Instance Norm layer and a seventh number of convolution layers.

18. The network of claim 17, wherein the sixth number equals to one, and/or the seventh number equals to two.

19. The network of claim 18, wherein the output of the Instance Norm layer is multiplied with the output of the first one of the two convolution layers, and then the result is added to the output of the second one of the two convolution layers.

20. A system for neural pose transfer, comprising an input device, a processor for processing input data, and an output device for outputting processed data;
wherein the processor is configured to build a computing model comprising: a pose feature extractor for receiving an input pose, and a style transfer decoder for receiving for extract pose feature, wherein:
the pose feature extractor comprises a first number of convolution layers and a first number of Instance Norm layers; the first number of convolution layers and the first number of Instance Norm layers are iteratively and serially connected;
the style transfer decoder comprises a second number of convolution layers, a third number of SPAdaIn residual blocks, and a tanh layer; the second number is one more than the third number; the second number of convolution layers and the third number of SPAdaIn residual blocks are iteratively and serially connected, with the convolution layers sandwiching the SPAdaIn residual blocks; and the tanh layer is the last layer of the style transfer decoder; and
an input identity mesh is concatenated with the output of the pose feature extractor and then input to the style transfer decoder, and the input identity mesh is meanwhile fed to each SPAdaIn residual block of the style transfer decoder.

* * * * *